United States Patent [19]

Gragnami

[11] E Patent Number: Re. 32,894

[45] Reissued Date of Patent: Mar. 28, 1989

[54] RAILWAY TIE PLATE AND A METHOD OF MAKING A RAILWAY TIE PLATE

[75] Inventor: Nelson A. Gragnami, Sao Paulo, Brazil

[73] Assignee: Pandrol Limited, London, England

[21] Appl. No.: 204,751

[22] Filed: Nov. 6, 1980

Related U.S. Patent Documents

Reissue of:

[64] Patent No.: 4,141,500
Issued: Feb. 27, 1979
Appl. No.: 805,163
Filed: Jun. 9, 1977

[51] Int. Cl.[4] ..... E01B 9/40; E01B 9/48; B21D 28/02

[52] U.S. Cl. ..... 238/304; 238/287; 238/306; 238/307; 29/16; 29/401.1; 72/325

[58] Field of Search ..... 238/264, 287, 292, 293, 238/299, 304, 306, 307, 349; 72/325, 326; 29/16, 401.1; 228/155; 113/116 HH

[56] References Cited

U.S. PATENT DOCUMENTS

| | | | |
|---|---|---|---|
| 823,827 | 6/1906 | Vaughan | 238/304 X |
| 2,008,940 | 7/1935 | Armstrong | 238/349 X |
| 3,717,302 | 2/1973 | Neumann | 238/287 |

FOREIGN PATENT DOCUMENTS

| | | | |
|---|---|---|---|
| 850497 | 9/1970 | Canada | 238/349 |
| 869385 | 5/1961 | United Kingdom | 238/349 |

*Primary Examiner*—Robert B. Reeves
*Assistant Examiner*—Scott H. Werny
*Attorney, Agent, or Firm*—Norbert P. Holler

[57] ABSTRACT

A railway tie plate has at least one rib to locate a railway rail and two arches under which parts of rail clips can be driven parallel to the rib. It can be made by deformation of a conventional tie plate designed for use with fastening devices for holding the rail on to the tie plate other than rail clips which are driven parallel to the rail.

10 Claims, 4 Drawing Sheets

RAILWAY TIE PLATE AND A METHOD OF MAKING A RAILWAY TIE PLATE

Matter enclosed in heavy brackets [ ] appears in the original patent but forms no part of this reissue specification; matter printed in italics indicates the additions made by reissue.

This invention relates to a railway tie plate, that is to say a plate which is to be secured to a railway tie (also called a "sleeper") and is to support and locate a railway rail.

According to a first aspect of the invention, a railway tie plate comprises at least one upwardly-projecting straight rib, for locating the flange at the bottom of a railway rail, and two arches integral with the rib on opposite sides of the tie plate under which parts of rail clips can be driven substantially parallel to the rib.

According to a second aspect of the invention, a railway tie plate comprises first and second upwardly-projecting aligned straight ribs, with their ends facing each other, for locating one side of the flange at the bottom of a railway rail, third and fourth upwardly-projecting aligned straight ribs, with their ends facing each other, parallel to the first and second ribs for locating the other side of the flange of the rail, a first arch integral with the ribs and having one flank partly between the facing ends of the first and second ribs and the other flank further from the third and fourth ribs and a second arch integral with the ribs and having one flank partly between the facing ends of the third and fourth ribs and the other flank further from the first and second ribs, whereby parts of rail clips can be driven, substantially parallel to the ribs, under the arches.

Preferably, that flank of each arch which is nearer the other arch is steeper than the other flank of the same arch.

When changing-over a railway track from an existing system, using the tie plates and means for holding the rails down on to the tie plates other than rail clips driven parallel to the longitudinal axis of the rail, to a new system using different tie plates and rail clips, driven parallel to the longitudinal axis of the rail, to hold the rails down on to the tie plates, it is common to discard the original tie plates. However, according to the present invention, they can be converted to tie plates according to the first aspect or the second aspect of the invention.

Thus, according to a third aspect of the invention there is provided a method of making a railway tie plate suitable for use with rail clips which are driven substantially parallel to the longitudinal axis of a railway rail resting on the tie plate, comprising heating and then deforming an existing railway tie plate, to which a railway rail is conventionally held by means other than by rail clips which are driven substantially parallel to the longitudinal axis of the rail, the existing tie plate comprising at least one upwardly-projecting straight rib for locating the flange at the bottom of a railway rail, the deformation being such that a portion of the rib is left substantially undeformed and two arches integral with the rib are formed on opposite sides of the tie plate under which parts of rail clips can be driven substantially parallel to the rib.

According to a fourth aspect of the invention, there is provided a method of making a railway tie plate suitable for use with rail clips which are driven substantially parallel to the longitudinal axis of a railway rail resting on the tie plate, comprising heating and then deforming an existing railway tie plate, to which a railway rail is conventionally held by means other than by rail clips which are driven substantially parallel to the longitudinal axis of the rail, the existing tie plate comprising two upwardly-projecting straight parallel ribs for locating opposite sides of the flange at the bottom of a railway rail, the deformation being such that two end portions of each rib are left substantially undeformed and constitute in the deformed tie plate first and second aligned ribs with their ends facing each other in one case and third and fourth aligned ribs with their ends facing each other in the other case and the deformation further being such that a first arch integral with the ribs is formed having one flank partly between the facing ends of the first and second ribs and the other flank further from the third and fourth ribs and a second arch integral with the ribs is formed having one flank partly between the facing ends of the third and fourth ribs and the other flank further from the first and second ribs, whereby parts of rail clips can be driven, substantially parallel to the ribs, under the arches.

The method according to the third or fourth aspect of the invention may further comprise placing a plug in a hole through the tie plate and securing it there by welding. More particularly, the method according to the third or fourth aspect of the invention may comprise prior to forming the existing tie plate, placing a plug in a hole through the tie plate, at a part of the tie plate which is subsequently to be part of one of the arches, and securing it there by welding.

The tie plates may be rolled steel tie plates.

The arches are stated above to be integral with the rib or ribs. Preferably the entire tie plate containing the arches and rib or ribs is constituted by a single piece of material, except possibly for plugs filling any undesired holes.

An example according to the invention is described below with reference to the accompanying drawings, in which.

Figure 1:
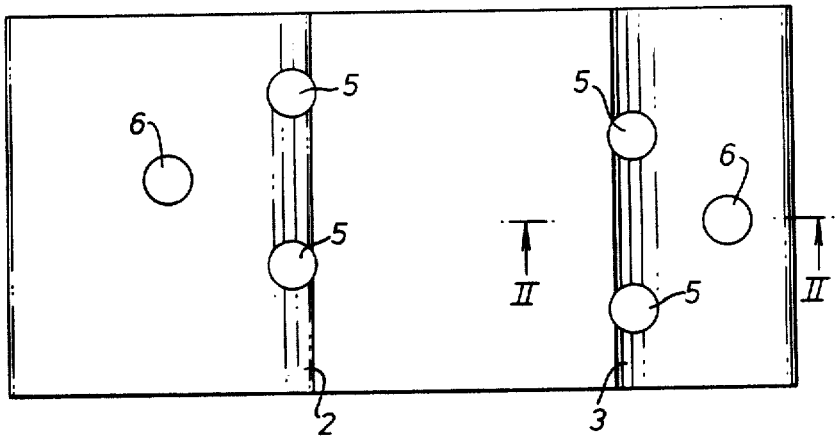
FIG. 1 is a plan view of a conventional tie plate.
Figure 2:
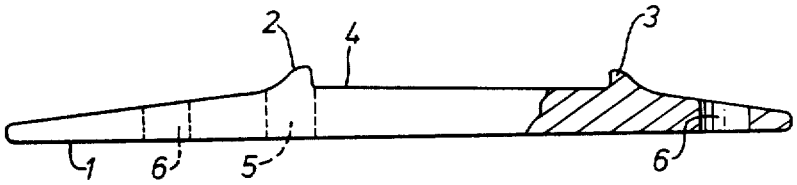
FIG. 2 is partly an end view of the same tie plate and partly a sectional view of it taken as indicated by the arrows II—II in FIG. 1.

The tie plate of FIGS. 1 and 2 is made of rolled steel and has a flat lower face 1 which rests on a railway tie (not shown), for example made of wood. There are two upwardly-projecting straight parallel ribs 2 and 3, of uniform cross-section throughout their length, on opposite sides of the plate and between them is a surface 4 which is flat and slopes downwardly from left to right. The flange at the bottom of a railway rail is to rest on the surface 4 and have its two sides located by the ribs 2 and 3, which are therefore spaced apart by a distance slightly greater than the width of the flange. Four circular holes 5 pass through the tie plate, partly through the ribs and partly through the surface 4, and through them are driven spikes which pass into the tie and have heads which bear on the flange to hold the rail down on to the tie plate. Further spikes are driven through holes 6 into the tie.

Figure 3:
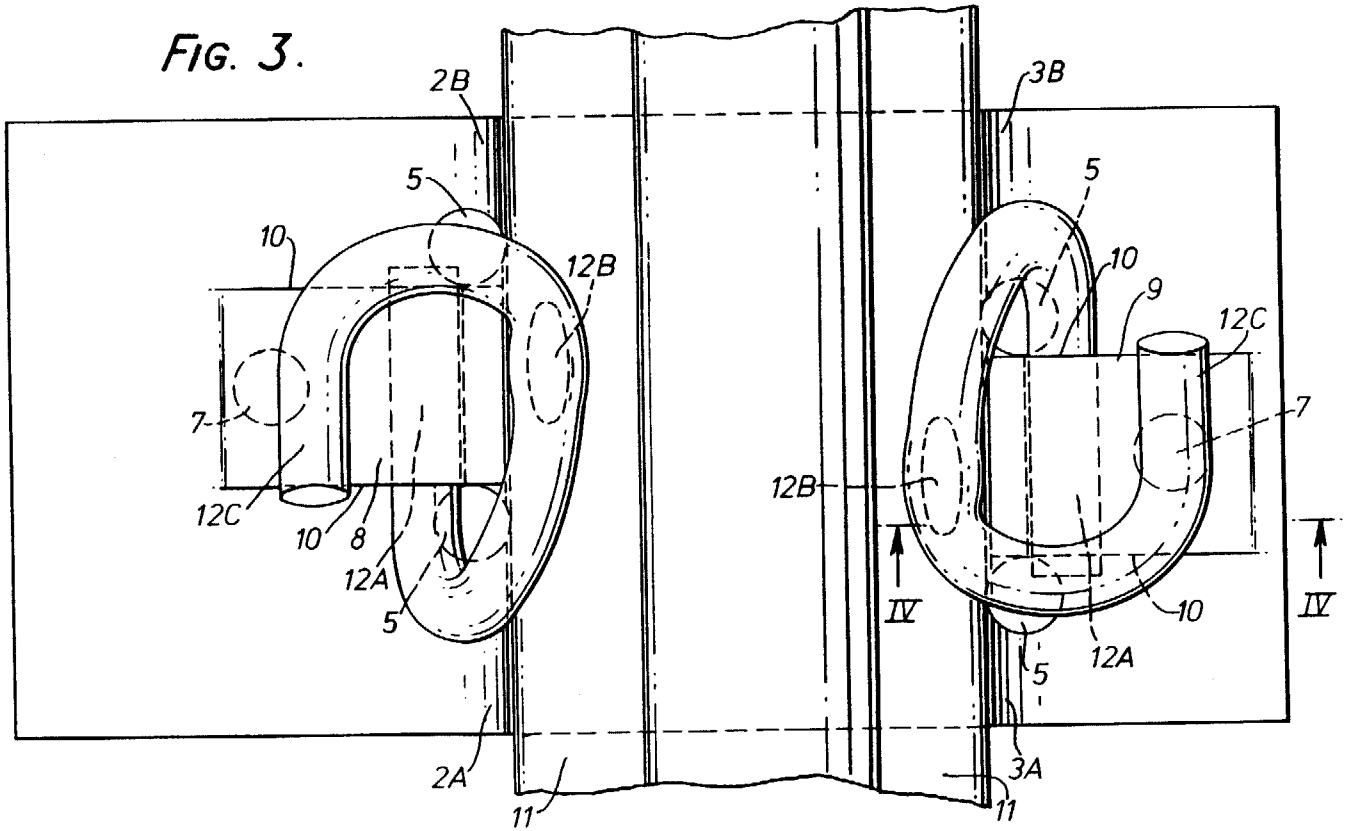
FIG. 3 is a plan view of an assembly comprising the same tie plate after deformation and a railway rail and two rail clips.
Figure 4:
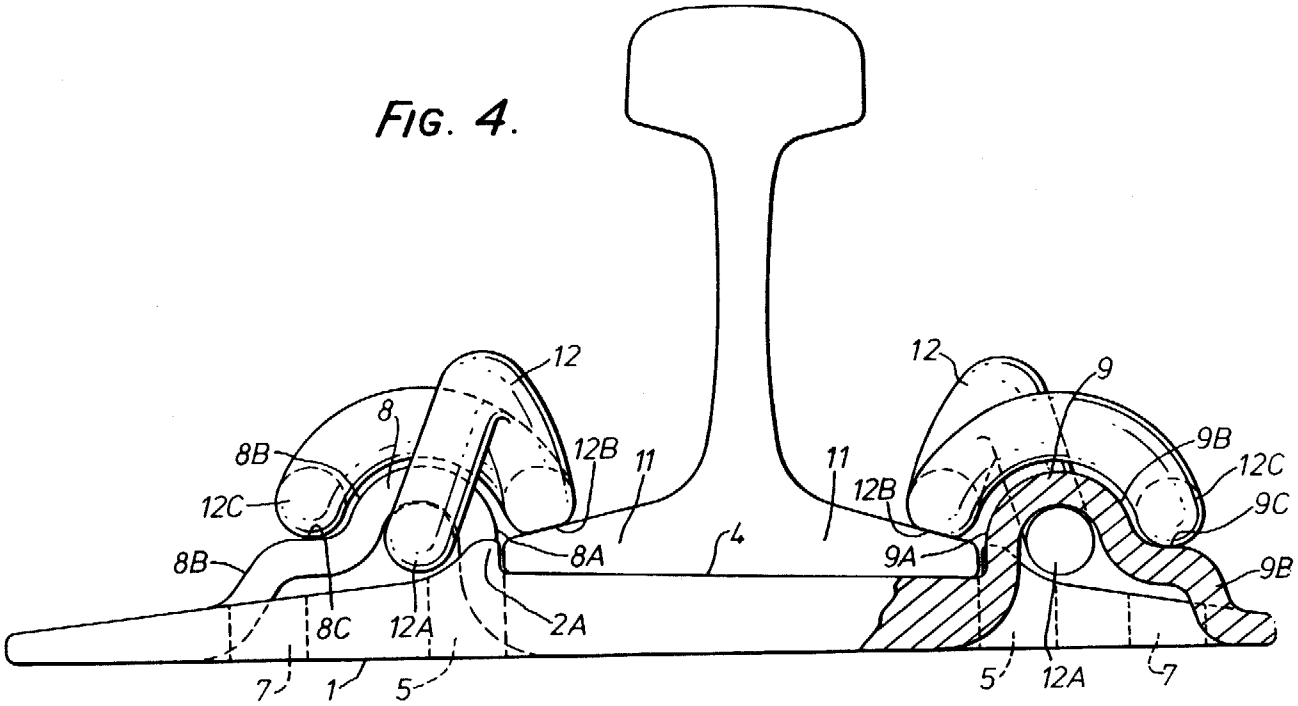
FIG. 4 is an end view of the assembly of FIG. 3, part of the deformed plate being shown by means of a sectional view, taken as indicated by the arrows IV—IV in FIG. 3.
Figure 5:
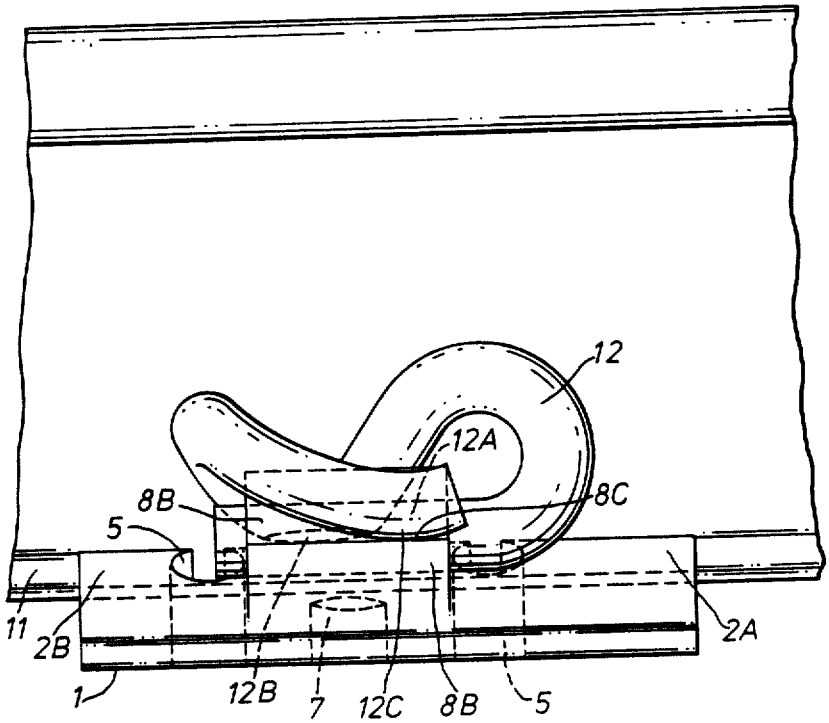
FIG. 5 is a side view of the assembly of FIG. 3.

To convert the tie plate shown in FIGS. 1 and 2 into a tie plate as shown in FIGS. 3 to 5, firstly two circular steel plugs 7 are placed in the holes 6, substantially filling them, and are welded there to the plate and then the plate is heated and deformed, by pressing tools which need not be explained or illustrated here because a man skilled in the art of pressing metal should have no difficulty in designing suitable pressing tools. The plugs 7 are shown only in the positions in which they exist before the deformation of the plate. Two end portions of each rib 2 and 3 remain substantially undeformed and form first and second aligned ribs 2A and 2B with their ends facing each other and third and fourth aligned ribs 3A and 3B with their ends facing each other. Arches 8 and 9 are also formed, the arch 8 having one flank 8A partly between the facing ends of the ribs 2A and 2B and the other flank 8B further from the ribs 3A and 3B and less steep than the flank 8A and having a platform 8C in it, whereas the arch 9 has one flank 9A partly between the facing ends of the ribs 3A and 3B and the other flank 9B further from the ribs 2A and 2B and less steep than the flank 9A and having a platform 9C in it. The steel shears along straight parallel lines 10 to form the arches.

Fresh holes (not shown) can be drilled or punched in desired places through the deformed tie plate to enable it to be secured by spikes to a wooden tie. Then a rail is placed with its flange 11 on the tie plate and is secured to the tie plate by clips 12, parts 12A of which are driven in opposite directions, parallel to the ribs and to the longitudinal axis of the rail, under the arches 8 and 9, there being a clear space under each arch through which a rod, longer than the arch, and of circular cross-section 1 centimeter in diameter, can pass without touching the top of the plate at either end of the arch. The clips 12 are made by bending steel rod of circular cross-section at least 1 centimeter in diameter except where flat portions 12B press on the rail flange. Portions 12C of the clips press on the platforms 8C and 9C.

The facing flanks 8A and 9A of the arches are set back from the facing flanks of the ribs 2A and 3A and the ribs 2B and 3B, i.e. they are further apart than the latter.

Instead of the deformation leaving two end portions of each rib in the original plate undeformed, the deformation could be only in the upper or lower half (considering FIG. 1) of the tie plate, leaving only one portion of each rib undeformed.

The original tie plate could be one having only one rib, to locate that side of the rail flange which is remote from the other rail, the other side of the rail flange being located only by spikes.

I claim:

1. A railway tie plate comprising [at least one upwardly-projecting straight rib] *on one side of an area of the plate on which a railway rail is to stand, first and second upwardly projecting straight ribs* , for locating *one side of* the flange at the bottom of [a railway] *the* rail, [and two arched retaining portions on opposite sides of the tie plate under which parts of rail clips can be driven substantially parallel to the rib] *said first and second ribs being aligned longitudinally of the rail with their ends facing each other, a first arched retaining portion having one flank partly between and integral with the facing ends of the first and second ribs and the other flank further from said area and, on the other side of said area, a second arched retaining portion, whereby parts of rail clips can be driven substantially parallel to the ribs, under the arched retaining portions.*

2. A tie plate according to claim 1 in which that flank of each arched retaining portion which is nearer the other arched retaining portion is steeper than the other flank of the same arched retaining portion.

3. A tie plate according to claim 1 comprising a plug in a hole through the tie plate and secured there by weld material.

4. A railway tie plate as claimed in claim [4] *1* comprising: a flat surface at the lowermost extremity of said plate extending over the entire length and breadth of said plate for placing on a railway tie and said [at least one upwardly-projecting straight rib] *first and second ribs* being rolled and joined at both sides to the remainder of the plate, for locating the flange at the bottom of a railway rail.

5. A railway tie plate comprising first and second upwardly-projecting straight ribs for locating one side of the flange at the bottom of a railway rail, said first and second ribs aligned longitudinally of the rail with their ends facing each other, third and fourth upwardly-projecting straight ribs parallel to the first and second ribs for locating the other side of the flange of the rail, said third and fourth ribs aligned longitudinally of the rail with their ends facing each other, a first arched retaining portion having one flank partly between and integral with the facing ends of the first and second ribs and the other flank further from the third and fourth ribs and a second arched retaining portion having one flank partly between and integral with the facing ends of the third and fourth ribs and the other flank further from the first and second ribs, whereby parts of rail clips can be driven, substantially parallel to the ribs, under the arched retaining portions.

6. A method of making a railway tie plate suitable for use with rail clips which are driven substantially parallel to the longitudinal axis of the railway rail resting on the tie plate, comprising heating and then deforming an existing railway tie plate, to which a railway rail is conventionally held by means other than by rail clips which are driven substantially parallel to the longitudinal axis of the rail, the existing tie plate comprising at least one upwardly-projecting straight rib for locating the flange at the bottom of a railway rail, the deformation being such that a portion of the rib is left substantially undeformed and two arched retaining portions are formed on opposite sides of the tie plate *under* which parts of rail clips can be driven substantially parallel to the rib.

7. A method according to claim 6 and further comprising placing a plug in a hole through the tie plate and securing it there by welding.

8. A method according to claim 6 and further comprising, prior to deforming the existing tie plate, placing a plug in a hole through the tie plate, at a part of the tie plate which is subsequently to be part of one of the arched retaining portions, and securing it there by welding.

9. A method according to claim 6, in which the deformation is such that in the deformed tie plate each arched retaining portion has that flank thereof which is nearer the other arched retaining portion steeper than its other flank.

10. A method of making a railway tie plate suitable for use with rail clips which are driven substantially parallel to the longitudinal axis of a railway rail resting on the tie plate, comprising heating and then deforming an existing railway tie plate, to which a railway rail is conventionally held by means other than by rail clips which are driven substantially parallel to the longitudinal axis of the rail, the existing tie plate comprising two upwardly-projecting straight parallel ribs for locating opposite sides of the flange at the bottom of a railway rail, the deformation being such that two end portions of each rib are left substantially undeformed and constitute in the deformed tie plate first and second aligned ribs with their ends facing each other in one case and third and fourth aligned ribs with their ends facing each other in the other case and the deformation further being such that a first arched retaining portion is formed having one flank partly between and integral with the facing ends of the first and second ribs and the other flank further from the third and fourth ribs and a second arched retaining portion is formed having one flank partly between and integral with the facing ends of the third and fourth ribs and the other flank further from the first and second ribs, whereby parts of rail clips can be driven, substantially parallel to the ribs, under the arched retaining portions.

* * * * *